Patented Aug. 4, 1925.

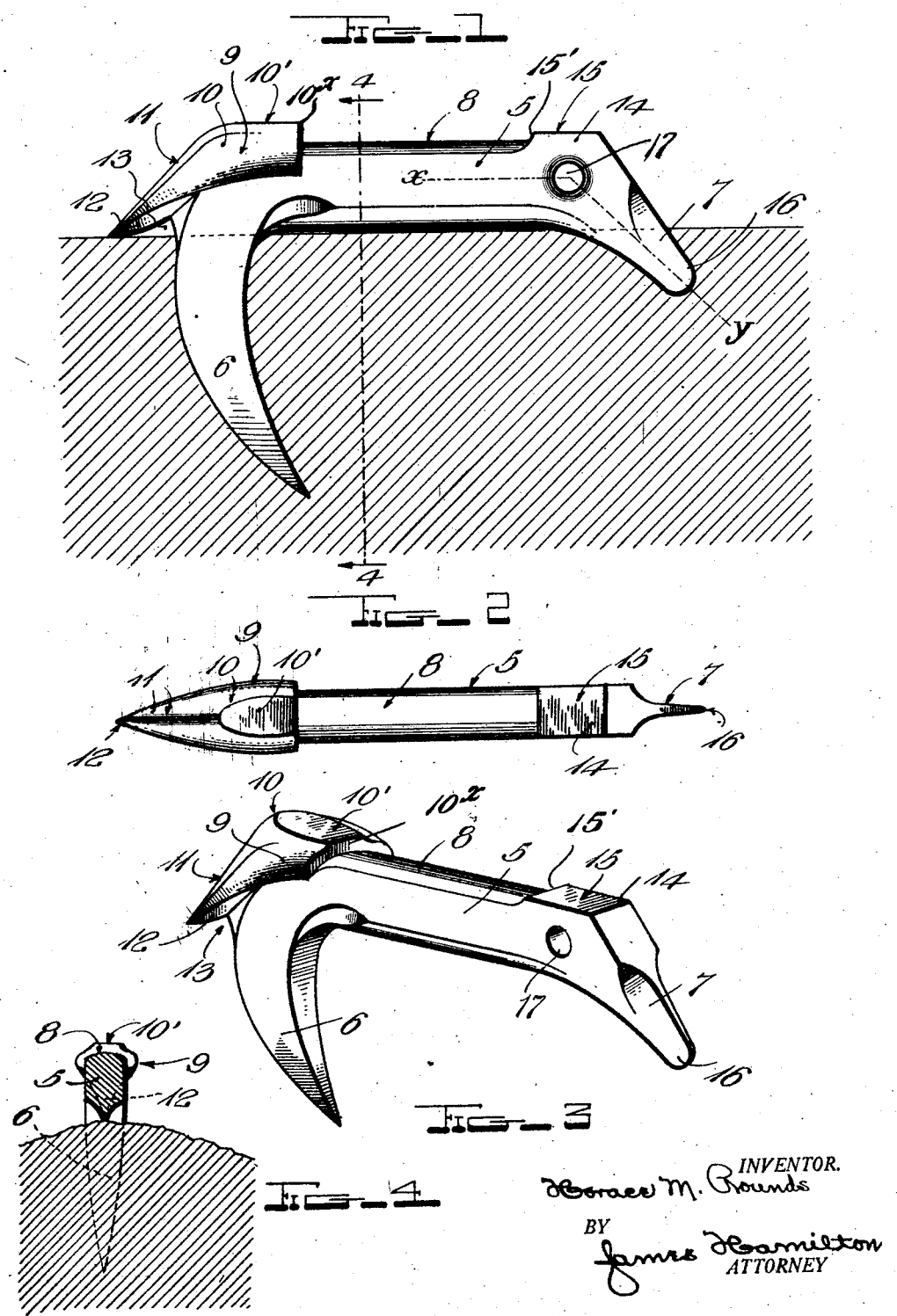

1,548,209

UNITED STATES PATENT OFFICE.

HORACE M. ROUNDS, OF TACOMA, WASHINGTON, ASSIGNOR TO WARREN AXE & TOOL COMPANY, OF WARREN, PENNSYLVANIA, A CORPORATION OF PENNSYLVANIA.

LOG GRAB.

Application filed January 7, 1924. Serial No. 684,865.

*To all whom it may concern:*

Be it known that I, HORACE M. ROUNDS, a citizen of the United States of America, residing at Tacoma, in the county of Pierce and State of Washington, have invented certain new and useful Improvements in Log Grabs, of which the following is a specification, reference being had to the accompanying drawings.

This invention relates to improvements in log-grabs (sometimes called grab-hooks), forms of which are disclosed in Patents Nos. 761,407 and 937,183 granted me and in Patent No. 901,304 granted Dennis W. Murphy. An object of this invention is to provide a log-grab which will prove efficient in use and in which the metal will be so distributed as to ensure that the log-grab will not break while in use and pieces of its metal (e. g., its tooth or its spur) be left embedded in the log, a condition fraught with the gravest danger to the life and limb of the sawyer who rides on the reciprocating carriage at the saw-mill and brings the logs against the cutting mechanism (e. g., the band-saw). The experience of lumbermen in the use of log-grabs has demonstrated that one of the points at which these devices are most liable to breakage and resulting destruction is the point of junction between the rear end of the shank (or body) and the tooth. The log-grab herein disclosed is so fashioned structurally and reinforced as to provide adequate strength at this point of junction to resist stresses tending to produce rupture or fracture there, such as the pounding of the sledge, maul or other tooth-driving tool, and the thrust of the pike, peavy or other tooth-extracting implement. When in use, a log-grab is coupled to a draft-device (e. g., a cable or chain); and, for the reception of the shackle or other coupling-member, an eye is formed in that end of the body or shank of the log-grab that lies opposite the bill or tooth. From this perforated end of the shank, a spur projects downwardly or depthwise, in the case of many log-grabs (see the patents hereinabove mentioned); and this spur is arranged to be driven into the log, in order to prevent such movement of the shank from side to side of the log as might tend to loosen the hold of the bill or tooth therein. Perforating the end of the shank, in order to form the eye, tends to weaken the shank and to make it less capable of withstanding, without rupture, the blows of the tool used to force the spur into the log. For the purpose of obviating, so far as may be practicable, the weakening of the shank due to the formation of the eye, the metal is massed around the latter and its wall is strongly reinforced, in the log-grab herein disclosed; and, in order further to lessen the danger of breakage of the shank at the perforated end thereof, in driving the spur, and to facilitate that operation, the spur is made longer depthwise than have spurs heretofore been made and its lower end or toe is thinned and made chisel-like. Furthermore, this depth-wise-elongated spur is given a pronounced forward-and-downward inclination from the shank so that the axis of the spur makes with the axis of the shank an angle that is markedly obtuse. This depth-wise elongation of the spur and the markedly obtuse inclination thereof to the shank have the result of throwing the part of the spur that enters the log further from the bill or tooth and of increasing the effectiveness of the spur in preventing any working loose of the tooth. Again, the mass of metal around the coupler-eye of the log-grab herein disclosed is made to rise or project upwardly above the top of the body or shank of the log-grab and is so spaced upwardly therefrom as to form a crown or impact-head for the spur arranged to prevent blows intended to drive the spur into the log from being delivered upon the shank, thereby tending to weaken and ultimately to break the same. Other features of this invention will appear as the description of the log-grab hereinafter progresses.

In the drawings illustrating the principle of this invention and the best mode now known to me of applying that principle, Fig. 1 is a side elevation, the log-grab being shown driven into a log; Fig. 2 is a plan view; Fig. 3 is a perspective view; and Fig. 4 is a section on the line 4—4 of Fig. 1.

5 denotes the body or shank of the log-grab, 6 its bill or tooth; and 7 the spur that serves to prevent sidewise displacement of the log-grab, after it has been driven into the log and the latter is being hauled way.

At the rear of the log-grab, there is massed a quantity of metal that forms an irregularly-shaped protuberance or boss 9 and is designed to reinforce this part of the log-grab. That part of the boss 9 that overlies or surmounts the bill or tooth 6 rises above the back (or top) 8 of the shank 5 so as to form an impact-head 10 the top-face 10' of which is designed to receive the blows of the sledge or maul, when the tooth 6 is being driven into the log. As is clearly shown in Figs. 1 and 3, this blow-receiving face 10' is spaced from and lies a substantial distance well above the topmost part of the shank 5, so that there is formed a well-defined shoulder or hump 10ˣ between the front of the mass 9 of metal and the shank or body 5. By thus providing a mass or quantity of metal over the tooth 6, the log-grab is given, at one of its most vulnerable points, added strength and support, whereby its resistance to the stresses that tend, in the ordinary use of the contrivance, to produce fracture there, is greatly enhanced. Furthermore, by raising the impact-receiving face 10', well above the level or plane of the topmost face (the back 8) of the shank 5, the blows of the tooth-driving maul will be directed and will naturally fall upon the raised face 10' and will not reach the shank 5, so that there is much less liability to breakage of the log-grab due to the strokes of the maul or sledge.

From the impact-head 10, the boss 9 curves or slopes downwardly in rear of the tooth 6; and this sloping part 11 of the boss 9 terminates in an extracting-lug 12, which is spaced from the tooth 6 and under which the point of the peavy or other tooth-extracting device is inserted, when the tooth is to be pried loose from the log. By making the extracting-lug 12 an integral part of the boss 9, the advantage is secured that the lug 12 derives strength from and is supported by the mass 9 of metal, so that the lug 12 is reinforced and made structurally capable of resisting, without deformation, the stresses to which it is subjected during the operation of loosening the log-grab from the log. Moreover, it becomes practicable to give the lug 12 a relatively higher position than that customarily found in known log-grabs, the base of the spaced extracting-lug 12 being at its junction with the boss 9 located well above the plane of the lowermost face of the shank 5, from which it results that the lug 12 is not driven into the log, when the grab is seated in hauling position (Fig. 1), and the place 13 where the point of the peavy is to be entered under the lug 12, when the log-grab is to be dislodged from the log, is more clearly defined and at all times visible to the lumberjack or, at any rate, is to be more readily and certainly found by him. In cases where the space into which the point of the peavy is to be inserted is not clearly visible to the lumberjack, he is apt to lose patience in trying to find the place and to stab around in the log with his peavy in an effort to locate it. In making these thrusts, he is very liable to break off the extracting-lug and thus to force himself to insert the point of his peavy under the shank just in front of the tooth, in an effort to extract the latter. If the shank now parts from the tooth and leaves the tooth embedded in the log, an inconsiderate lumberjack may allow the tooth to remain hidden in the log, instead of going to the trouble of digging the tooth out of the log, despite the great peril to which the sawyer who cuts up the log into boards is subjected by there being concealed metal in the log. By the construction hereinbefore described, it is sought to safeguard the sawyer from the peril just mentioned. By giving to the part 11 of the boss 9 a rather sheer or steep slope (Figs. 1 and 3) away from the impact-head 10, the inclined part 11 is safeguarded from being struck by the sledge or maul during the driving of the tooth 6 into the log.

At the front end of the shank 5, the metal is massed (Fig. 3) around and above the coupler-eye 17 that serves for the reception of the coupling-member (e. g., a shackle) by which the log-grab is attached to the draft-device, whereby the wall of the coupler-eye 17 is reinforced and weakness at this point due to the formation of this hole 17 is obviated; furthermore, there is provided a second impact-head or boss 14 that overlies the spur 7 and the upper face 15 of which is flattened and extends forwardly and throughout its extent lies a substantial distance above the back 8 of the shank 5 so that there is formed a shoulder 15'. This flattened face 15 is designed to receive the strokes of a mallet, hammer or like tool, without injury thereto, when the wood of the log is hard and such an instrument is required to drive the spur 7 thereinto. The flattened, blow-receiving face 15, extending forwardly well above the adjacent top surface of the shank, admits of the provision of the mass of metal that reinforces the wall of the coupler-eye 17 and the base of the spur 7 and safeguards against the spur's breaking off and being left hidden in the log. To make the spur capable of entering the log more readily, it is made chisel-like and its point or toe 16 is given a somewhat thin edge (Fig. 3). As shown, the width of the spur 7 measured parallel to the lengthwise axis of the shank 5 is small compared with the length of the spur measured depthwise or along the dotted line $y$. Furthermore, the spur 7 does not project straight down from the shank 5 but it extends both forwardly and downwardly; and, as is shown by the inclination of the dotted lines $x$, $y$, to each other, the angle made by the spur 7 with the shank 5 is much greater than a right angle, that is, it is an angle of great obtuseness. Again, as compared with spurs of prior grabs, the spur 7 is made longer depthwise and so takes a deeper bite into the log. Not only does the spur 7 require comparatively little force to cause it to become embedded in the log, but its augmented length depthwise and its great inclination to the shank 5 have the effect of increasing the interval between the toe 16 of the spur 7 and the tooth 6; and the increase in this interval imparts to the log-grab a greater capacity to offer resistance to sidewise displacement and to loosening of the tooth 6 produced by such displacement, during the hauling of the log. It will be found that, in case the wood of the log is one of the softer varieties or kinds, the spur 7 may be driven home by a thrust from the hand or a blow from the heel.

In accordance with the patent statutes, I have shown and described the preferred form of this invention; but I desire it to be distinctly understood that I fully realize that changes may be made in the structure herein disclosed and that I intend to include within the scope of the claims that follow hereinafter all modifications of the preferred form of this invention that do not depart substantially from the spirit thereof.

I claim:

1. A log-grab including a shank and a tooth or bill, and provided with a metal reinforcement or boss that overlies and projects above the shank from the rear or tooth-part of the log-grab; one portion of the boss surmounting the tooth and being formed at its top with an impact-head arranged to receive the blows of the tooth-driving tool and lying well spaced above the topmost contiguous surface of the shank, said portion of the boss extending well above the said surface and safeguarding the latter from such blows; the boss being further formed with an inclined portion that slopes downwardly in rear of the tooth and away from the impact head and terminates in an extracting-lug that is spaced from the tooth and forms part of and is reinforced by the mass of metal constituting the boss; and the base of the spaced extracting-lug being at its junction with the boss located well above the plane of the lowermost face of the shank and affording an opening visible to the woodsman for the insertion of his grab-extracting tool when the log-grab is fully driven and the bottom of the shank lies against the log.

2. A log-grab having a tooth or bill at its rear end, a spur at its front end, and a shank intermediate the tooth and spur and formed with a coupler-eye near where the spur projects depthwise from the shank; the wall of the coupler-eye being substantially thickened by metal that is massed at the junction of the spur with the shank and that projects upwardly well beyond the top of the shank to form a boss the top of which is spaced well above the adjacent top surface of the shank and safeguards the shank from the blows of the spur-driving means; the top of the boss being flattened and thereby adapted to receive the blows of the spur-driving means without injury thereto; and the flat top of the boss extending forwardly well above the level of the top of the shank to admit of the provision of a mass of metal that reinforces the wall of the coupler-eye and the base of the spur and safeguards against the spur's breaking off and being left hidden in the log.

Signed at the city of Tacoma, in the county of Pierce and State of Washington, this twenty-ninth day of December, 1923, in the presence of the two undersigned witnesses.

HORACE M. ROUNDS.

Signed in the presence of—
ELLA READ,
JESSE H. READ.